United States Patent Office 2,740,342
Patented Apr. 3, 1956

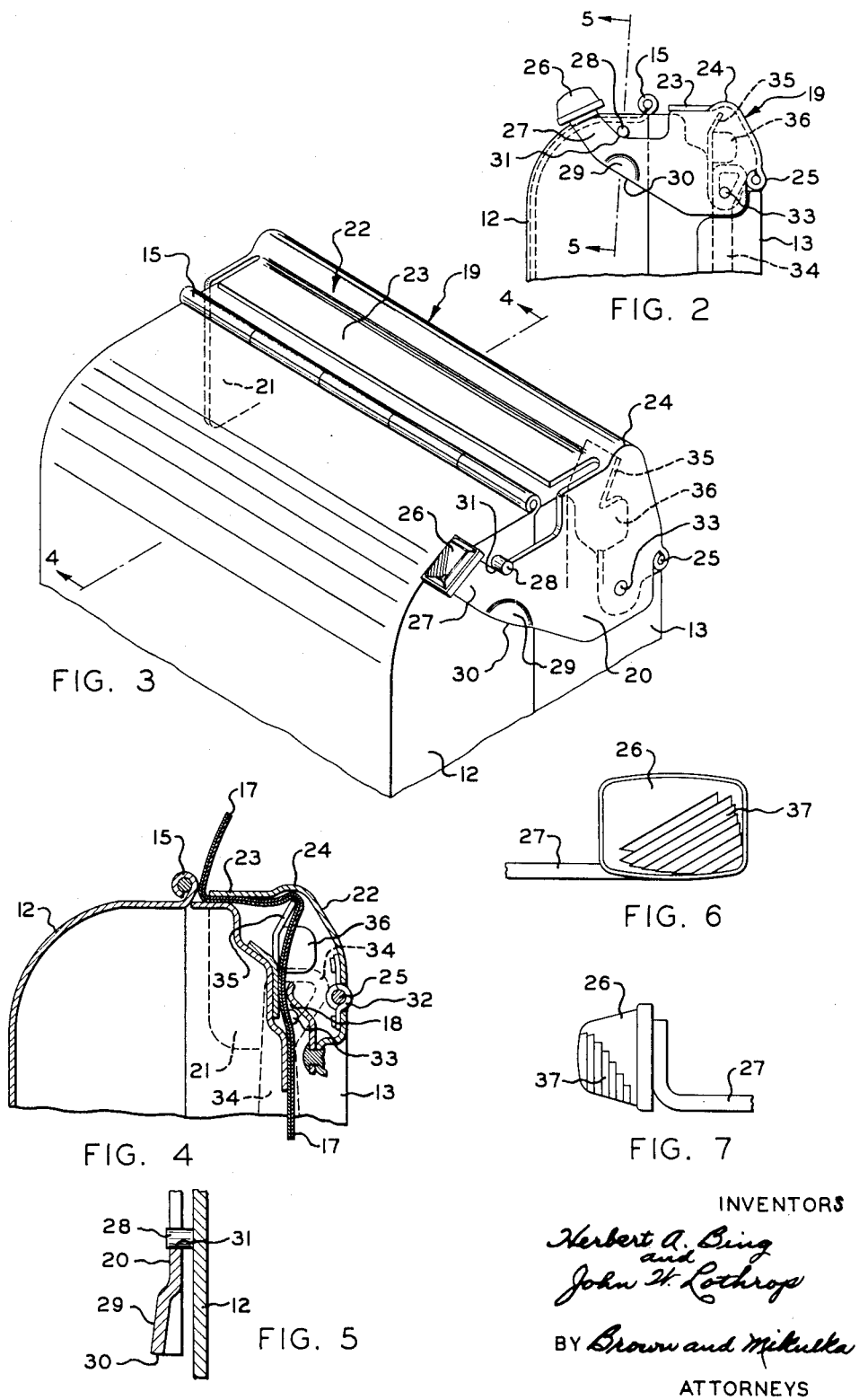

2,740,342
SHEET-SEVERING MECHANISM FOR PHOTOGRAPHIC APPARATUS

Herbert A. Bing, Wellesley, and John W. Lothrop, Westwood, Mass., assignors to Polaroid Corporation, Cambridge, Mass., a corporation of Delaware Application May 27, 1953, Serial No. 357,788

4 Claims. (Cl. 95—13)

This invention relates to a cutter bar for severing sheet materials, and particularly for severing photographic sheet materials drawn through an aperture in a camera.

An object of the invention is to provide a convenient means for clamping and cutting sheet materials which have been drawn through an aperture, the aforesaid means to act as a closure for the aperture.

Another object of the invention is to provide a means which is simple in operation and construction whereby a cutting device of the character described may be positively locked in an operative position.

Other objects of the invention will in part be obvious and will in part appear hereinafter.

This invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 2 is an enlarged, fragmentary view of the camera and mechanism of Fig. 1 showing the same at a closed or operative position;

Fig. 3 is a fragmentary, perspective view further illustrating the invention at an operative position;

Fig. 4 is a fragmentary sectional view substantially along the line 4—4 of Fig. 3;

Fig. 5 is a diagrammatic view in section substantially along the line 5—5 of Fig. 2;

Fig. 6 is an enlarged view in plan showing a preferred form of one of the disclosed elements; and Fig. 7 is an enlarged view in elevation of the element shown in Fig. 6.

Figure 1:
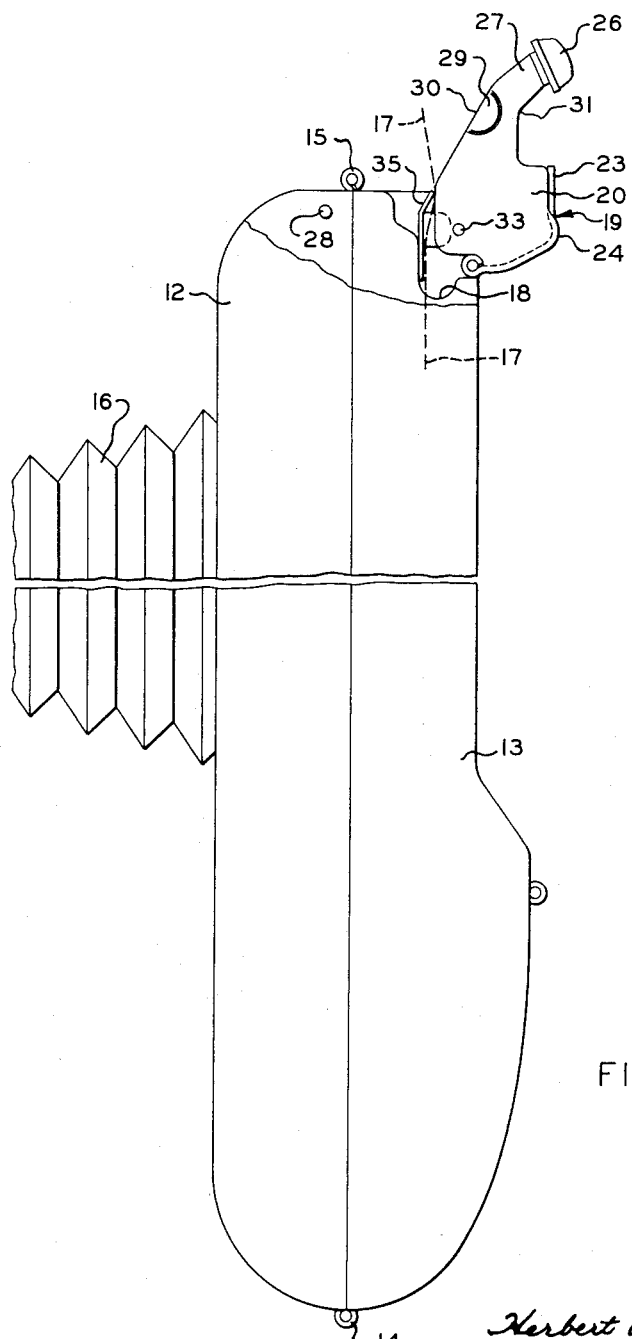
Figure 1 is a diagrammatic, fragmentary view of a hand-held camera embodying the herein disclosed invention wherein the device is shown at an open or inoperative position.

The invention is adapted for incorporation into the structure of a camera of the type shown in the copending application of Herbert A. Bing and James E. Hunter, Jr., Serial No. 277,672, filed March 20, 1952 for Photographic Apparatus, and illustrated in Fig. 1, wherein photographic sheet materials are processed and from which continuous predetermined lengths of the said materials are drawn manually through a slot in the casing of the camera and severed from materials remaining therein. The invention comprises a means for both severing the sheet materials and shielding the aperture, through which the materials are drawn, from the entrance of light. The invention is so mounted on the camera that pivoting the cutter bar into an operative or closed position engages a positive locking means whereby the cutter is retained in that position, thus relieving the operator from the necessity of manually holding the cutter bar in position while the sheet materials are being severed. The locking means may be instantly disengaged to permit the cutter bar to be pivoted to an inoperative or open position, allowing withdrawal of the next successive portion of the photographic sheet materials.

Referring to Fig. 1 the camera comprises casing portions 12 and 13 mounted for pivotal movement with respect to one another by hinge 14 and an intermediate portion (not shown) mounted on hinge 15. A fragment of the bellows 16 is shown, it being understood that the features of the camera and the other operative elements therein may be similar to those of the camera described in the above-mentioned copending application. The photographic sheet materials 17 are withdrawn through passage 18 provided between the casing portions 12 and 13 with the said portions at a closed position.

In the embodiment of the invention shown in the drawings, a yoke-like element 19, comprising two arms 20 and 21 and a transverse connecting member 22 having a relatively flat, straight edge portion 23 and a convex portion 24, is pivotally mounted upon casing portion 13 of the camera by means of a hinge 25. Member 22 coupled with the arms 20 and 21 provides a closure for slot 18, and such means as a torsion spring 32 in conjunction with the hinge 25 may be adapted to impart a counterclockwise bias (as shown in Fig. 1) to the element 19, urging the said element into a closed position and thus preventing the entrance of light into the aforementioned slot.

The locking means comprises a release button 26 on the end of an extension 27 of arm 20 and a relatively short pin 28 secured to casing portion 12 of the camera by some suitable way such as staking. Arm 20 is so formed or positioned with respect to the camera casing that when element 19 is pivoted to a closed position, the clearance between the inner surface of the portion of said arm adjacent to pin 28 and casing portion 12 is less than the length of pin 28, thereby causing the edge of said portion of arm 20 to engage pin 28, whereas the clearance between the portion of the inner surface of arm 20 adjacent to the leading edge of said arm (when arm 20 is pivoted clockwise) and casing portion 12 is greater than the length of pin 28, thus permitting the leading edge to clear the end of said pin. Arm 20 may be provided with a raised section 29 shaped substantially as shown, the height of which increases to a maximum at the leading edge 30. The clearance between the inside surface of leading edge 30 of the raised portion 29 and casing 12 is such that edge 30 clears the end of pin 28 and the inside surface of raised portion 29 acts as a ramp coacting with the end of pin 28, deforming arm 20 so that the same may ride over the end of said pin. Due to its resiliency, arm 20 resumes its former configuration after clearing pin 28 so that curved engagement edge 31 of said arm is engaged by the pin 28, preventing any clockwise movement of yoke element 19 from the closed position.

As a means of enabling the operator to release arm 20 and pivot element 19 is a clockwise direction, a button 26 serrated so as to indicate the direction of pressure to be applied is mounted on arm extension 27. Pressure manually applied to button 26 in the direction indicated by serrations 37 acts to deform the arm 20, thus increasing the clearance between said arm and casing 12 and disengaging said arm so that it slides over the end of pin 28.

Pins 33 are provided on each arm to cooperate with linkage members 34 which actuate a release mechanism (not shown) comprising the camera and shown in the aforementioned copending application.

With the yoke-like element 19 in a closed or operative position, photographic sheet material 17 extends through the passage 18 and is supported by angular guide strips 35 positioned so as to require the said material to curve sharply around the ends of said guides, the curvature of the sheets conforming substantially to that of the inner surface of convex portion 24 of connecting member 22. This bending of the sheet materials over the edge of the guides 35 serves to prevent any lineal movement of the sheet material, while lateral movement of the material is opposed by the guide flanges 36. The short portion of sheet material 17 extending through passage 18, curved around guide strips 35 and underlying connecting member 22 provides a leader or tab which may be grasped by the operator. When element 19 is pivoted to closed position and is held at said position by the aforementioned locking means, a length of sheet material may be severed by manually drawing or tearing the same against a suitably formed and sharpened edge of flat portion 23 of connecting member 22.

After the material is severed, the cutter bar 19 may be unlocked and pivoted to an open position by pressure on the release button 26, permitting the operator to grasp the short portion or leader of the sheet materials 17 and draw another length through the passage 18 whereupon the cutter bar may be closed and the severing procedure repeated.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic apparatus wherein photosensitive sheet materials are processed and from which portions of said sheet materials are successively withdrawn and comprising a casing within which said sheet materials are processed, means within said casing for processing said sheet materials, a passage in said casing through which said sheet materials are withdrawn, sheet-severing means mounted adjacent said passage for severing portions of sheet materials extending through said passage by leaving a leader of said materials for withdrawing succeeding portions thereof from said apparatus, said sheet-severing means preventing the admission of light into said passage and comprising a cutter bar having an outwardly curved cross section and a sharpened longitudinal edge for severing portions of said sheet materials when said materials are drawn against said sharpened edge, the combination with said sheet-severing means of hinge means comprising the longitudinal edge section of said cutter bar opposite said sharpened edge for so mounting said cutter bar on said casing that said cutter bar is pivotable from an operative position wherein said curved portion overlaps said passage to an inoperative position in which said cutter bar is to one side of said passage, an elongated deformable arm dependent from one end of said cutter bar and being disposed closely adjacent a wall of said casing when said cutter bar is in operative position, and an engagement member mounted on one wall of said casing, said member having an engagement surface located in the path of movement of said arm and substantially perpendicular to the path of movement thereof, said arm being movable completely past said engagement member during movement of said cutter bar into operative position and having a leading edge section adapted to clear said engagement member and a trailing edge section located on the side of said arm closest said cutting edge of said cutter bar, said trailing edge including an engagement section so formed as to present a surface perpendicular to the direction of movement of said arm and adapted to be engaged by said engagement surface of said member for preventing the movement of said cutter bar from operative position, said engagement section of said arm being located more remote from the pivotal axis of said cutter bar than said sharpened cutting edge thereof.

2. In a photographic apparatus wherein photosensitive sheet materials are processed and from which portions of said sheet materials are successively withdrawn and comprising a casing within which said sheet materials are processed, means within said casing for processing said sheet materials, a passage in said casing through which sheet materials are withdrawn, sheet-severing means mounted adjacent said passage for severing portions of sheet materials extending through said passage by leaving a leader of said materials for withdrawing succeeding portions thereof from said apparatus, said sheet-severing means preventing the admission of light into said passage and comprising a cutter bar having an outwardly curved cross section and a sharpened longitudinal edge for severing portions of said sheet materials when said materials are drawn against said sharpened edge, the combination with said sheet-severing means of hinge means comprising the longitudinal edge section of said cutter bar opposite said sharpened edge for so mounting said cutter bar on the rear wall of said casing adjacent said passage that said cutter bar is pivotable from an operative position wherein said curved portion overlaps said passage to an inoperative position in which said cutter bar is at the rear of said passage, an elongated resilient deformable arm dependent from one end of said cutter bar, said arm extending forward and being disposed closely adjacent a side wall of said casing when said cutter bar is in operative position, and a pin mounted on said side wall of said casing extending therefrom parallel to the pivotal axis of said cutter bar, said pin having an engagement surface located in the path of movement of said arm and substantially perpendicular to said path of movement, said arm being movable from a location rearward of said pin when said cutter bar is in inoperative position to a location completely forward of said pin when said cutter bar is in operative position, said arm including a ramp-like section located intermediate its ends and more remote from the pivotal axis of said cutter bar than the sharpened edge thereof against which said sheet materials are drawn for severing said materials, said ramp-like section having a leading edge so formed as to clear the end of said pin during pivotal movement of said cutter bar into operative position and being so formed as to coact with the end of said pin for deforming said arm away from said side wall so that said arm is movable past said pin into operative position, said ramp-like section having a trailing edge so formed as to present a surface which is perpendicular to its direction of movement and adapted to be positively engaged by said engagement surface of said pin for preventing the movement of said cutter bar from operative position, said arm being manually deformable in a direction parallel to the pivotal axis of said cutter bar to permit its movement past said pin and the movement of said cutter bar from operative position, the free end of said resilient arm being so formed as to indicate to the operator the direction of pressure to be applied thereto for deforming and unlocking said arm and pivoting said cutter bar into inoperative position.

3. In a photographic apparatus wherein photosensitive sheet materials are processed and from which portions of said sheet materials are successively withdrawn and comprising a casing within which said sheet materials are processed, means within said casing for processing said sheet materials, a passage in said casing through which said sheet materials are withdrawn, sheet-severing means mounted adjacent said passage for severing portions of sheet materials extending through said passage while leaving a leader of said materials for withdrawing succeeding portions thereof from said apparatus, said sheet-severing means preventing the admission of light into said passage and comprising a cutter bar having an outwardly curved cross section and a sharpened longitudinal edge for severing portions of said sheet materials when said materials are drawn against said sharpened edge, the combination with said sheet-severing means of hinge means comprising the longitudinal edge of said cutter bar opposite said sharpened edge for so mounting said cutter bar on said casing that said cutter bar is pivotable from an operative position wherein said curved portion overlaps said passage to an inoperative position in which said cutter bar is to one side of said passage, a pair of platelike guide members secured to a wall of said casing within said passage for supporting a portion of said sheet materials, each of said guide members including an unsupported end section extending toward the inner concave surface of said curved portion of said cutter bar and a sheet-engaging edge located closely adjacent said inner concave surface when said cutter bar is operatively positioned, substantially only said edges of said guide members engaging said sheet materials and said concave surface cooperating with said guide members for deforming portions of said sheet materials around said sheet-engaging edges to retain said sheet materials against movement during severance thereof, an elongated deformable arm dependent from one end of said cutter bar and being disposed closely adjacent a wall of said casing when said cutter bar is in operative position, and an engagement member mounted on said one wall of said casing, said member having an engagement surface located in the path of movement of said arm and substantially perpendicular to the path of movement thereof, said arm being located completely to one side of said engagement member when said cutter bar is in operative position and having an edge section intermediate its ends so formed as to present a surface perpendicular to its direction of movement and adapted to be engaged by said engagement surface of said member for preventing the movement of said cutter bar from operative position.

4. In a photographic apparatus wherein photosensitive sheet materials are processed and from which portions of said sheet materials are successively withdrawn and comprising a casing within which said sheet materials are processed, means within said casing for processing said sheet materials, a passage in said casing through which said sheet materials are withdrawn, and sheet-severing means mounted adjacent said passage for severing portions of sheet materials extending through said passage while leaving a leader of said materials for withdrawing succeeding portions thereof from said apparatus, said sheet-severing means preventing the admission of light into said passage and comprising a cutter bar having an outwardly curved cross section and a sharpened longitudinal edge for severing portions of said sheet materials when said materials are drawn against said sharpened edge, the combination with said sheet-severing means of hinge means comprising the longitudinal edge section of said cutter bar opposite said sharpened edge for so mounting said cutter bar on the rear wall of said casing adjacent said passage that said cutter bar is pivotable from an operative position wherein said curved portion overlaps said passage to an inoperative position in which said cutter bar is at the rear of said passage, means within said passage for guiding and supporting said sheet materials therethrough, said means including a pair of laterally spaced platelike guide members secured within said passage to the forward wall of said casing for supporting portions of said sheet materials extending through said passage, each of said guide members including an unsupported end section extending toward the inner concave surface of said curved portion of said cutter bar and including a sheet-engaging edge at its unsupported end located closely adjacent said concave surface when said cutter bar is operatively positioned, substantially only said edges of said guide members engaging said sheet materials and said concave surface cooperating with said guide members for deforming portions of said sheet materials around said sheet-engaging edges to frictionally retain said sheet materials against movement during severance of said sheet materials, an elongated resilient arm depedent from one end of said cutter bar and being disposed closely adjacent a side wall of said casing when said cutter bar is in operative position, and a pin mounted on said side wall of said casing, said pin having an engagement surface located in the path of movement of said arm and substantially perpendicular to said path of movement, said arm being movable from a location rearward of said pin when said cutter bar is in inoperative position to a location completely on the forward side of said pin when said cutter bar is in operative position, said arm including a ramplike section located intermediate its ends and having a leading edge so formed as to clear the end of said pin during pivotal movement of said cutter bar into operative position, said ramplike section being so formed as to coact with the end of said pin for deforming said arm away from said side wall so that said arm is movable past said pin into operative position, said ramplike section having a trailing edge so formed as to present a surface perpendicular to its direction of movement and adapted to be positively engaged by said engagement surface of said pin for preventing the movement of said cutter bar from operative position, said arm being manually deformable in a direction parallel to the pivotal axis of said cutter bar to permit its movement past said pin and the movement of said cutter bar from operative position, the free end of said resilient arm being so formed as to indicate to the operator the direction of pressure to be applied thereto for deforming and unlocking said arm and pivoting said cutter bar into inoperative position.

References Cited in the file of this patent

UNITED STATES PATENTS

| | | |
|---|---|---|
| 650,456 | Duncan | May 29, 1900 |
| 690,465 | Schirmer | Jan. 7, 1902 |
| 1,491,717 | Mace | Apr. 22, 1924 |
| 2,510,306 | Bachelder | June 6, 1950 |
| 2,654,544 | Pusheck | Oct. 6, 1953 |